US005979913A

United States Patent [19]

Kosik et al.

[11] Patent Number: 5,979,913

[45] Date of Patent: Nov. 9, 1999

[54] UNIVERSAL DRIVING AND SETTING TOOL AND METHOD OF USING SAME

[76] Inventors: Thomas Kosik, 4 Kosik Ter., Pelham, N.H. 03076; David Caruso, 100 Brady Ave., Salem, N.H. 03079

[21] Appl. No.: 09/080,985

[22] Filed: May 19, 1998

[51] Int. Cl.[6] .......... B23B 45/16

[52] U.S. Cl. .......... 279/145; 7/158; 81/44; 227/147; 279/14; 408/239 A; 173/29

[58] Field of Search .......... 7/158; 173/29, 173/50; 227/147; 81/44; 279/14, 143–145; 72/477; 408/239 R, 239 A

[56] References Cited

U.S. PATENT DOCUMENTS

| | | | |
|---|---|---|---|
| 3,655,244 | 4/1972 | Swisher | 299/91 |
| 3,690,390 | 9/1972 | Chromy | 175/388 |
| 4,007,795 | 2/1977 | Gawron et al. | 173/50 |
| 4,171,083 | 10/1979 | Lippacher et al. | 227/69 |
| 4,218,794 | 8/1980 | Seidel et al. | 7/138 |
| 4,218,795 | 8/1980 | Ernst et al. | 7/158 |
| 4,468,826 | 9/1984 | Moores, Jr. | 7/158 |
| 4,525,111 | 6/1985 | Gutsche | 408/239 |
| 4,602,414 | 7/1986 | Bartholomew et al. | 72/477 |
| 4,867,249 | 9/1989 | Watkins, Jr. et al. | 173/29 |
| 4,890,779 | 1/1990 | Giannuzzi | 227/139 |
| 5,030,043 | 7/1991 | Fischer et al. | 408/241 R |
| 5,085,546 | 2/1992 | Fischer | 81/44 |
| 5,152,649 | 10/1992 | Popp | 411/55 |
| 5,470,180 | 11/1995 | Jore | 279/75 |
| 5,502,936 | 4/1996 | Bayer et al. | 52/235 |
| 5,569,007 | 10/1996 | Abraham | 411/82 |

FOREIGN PATENT DOCUMENTS

| | | | |
|---|---|---|---|
| 3410007 | 9/1985 | Germany | 227/147 |

*Primary Examiner*—Steven C. Bishop
*Attorney, Agent, or Firm*—Bourque & Associates, P.A.

[57] ABSTRACT

A universal driving and setting tool is used to drive and set an anchor, such as a concrete anchor, having an anchor sleeve and an anchor slug positioned within a bore formed in the anchor sleeve. The driving and setting tool includes an attachment that fits over standard drill bits used in a hammer drill for drilling a hole in a substrate, such as concrete, in which the anchor is set. The attachment engages an end of the drill bit and can fit over drill bits having different lengths and having shanks of different shapes. The driving and setting tool also includes a reversible adapter that is positioned in the attachment in either a first or second position. In a first position, an anchor sleeve hammering portion on the reversible adapter faces outwardly to hammer the anchor sleeve into the hole within the substrate. In the second position, an anchor slug hammering portion extends outwardly to hammer the anchor slug within the anchor sleeve, thereby securing the anchor sleeve against the hole in the substrate and setting the anchor.

22 Claims, 6 Drawing Sheets

UNIVERSAL DRIVING AND SETTING TOOL AND METHOD OF USING SAME

FIELD OF THE INVENTION

The present invention relates to driving and setting tools for use in driving and setting anchor devices, and more particularly, to a driving and setting tool used with a hammer drill to drive and set a concrete anchor.

BACKGROUND OF THE INVENTION

Anchoring devices, such as concrete anchors 10, FIG. 1, are well known in the art for securing structural members to a substrate 12. A conventional concrete anchor 10 includes an anchor sleeve 14 having a bore 16 with an internal threaded portion 18 and a frusto-conical portion 20. An anchor slug 22 is positioned within the bore 16 of the anchor sleeve 14, for setting the anchor.

In use, the anchor sleeve 14 is positioned within a hole 24 formed in the substrate 12, for example by drilling. Typically, the anchor sleeve 14 must be hammered into the hole 24 until a top rim 26 of the anchor sleeve 14 is generally flush with the surface of the substrate 12. Next, the anchor slug 22 must be driven into the frusto-conical portion 20 of the bore 16 to expand the anchor sleeve 14 outwardly, thereby securing the anchor sleeve 14 within the hole 24 in the substrate 12. Structural members can then be secured to the anchor device 10 by engaging the threaded portion 18 of the anchor sleeve 14.

This process of driving and setting the anchor device 10 typically involves using a number of different types of tools. For example, a hammer drill with a drill bit is used to drill the hole 24. A hammer must then be used to hammer the anchor sleeve 14 into the hole 24. Finally, a hammer is used with a manual driving tool to set the anchor 10 by driving the anchor slug 22 into the anchor sleeve 14. Alternatively, the drill bit can be replaced with one or more different hammering tools used in the hammer drill. Using multiple tools or replacing the drill bit with one or more hammering tools is time consuming and tedious. Setting anchor devices using these existing tools and methods can also be hazardous, for example, when the user is standing on a ladder to install the anchor device in a location that is difficult to reach. Also, the existing hammering tools are difficult to properly align with the anchor sleeve 14 and can cause damage to the anchor sleeve 14 at the top rim 26 when hammering the sleeve 14 into the hole 24.

One type of attachment used for a rotary hammer tool is disclosed in U.S. Pat. No. 4,007,795. The attachment disclosed in this patent, however, is used to drive the anchor slug 22 into the anchor sleeve 14 but cannot be used to first hammer the anchor sleeve 14 into the hole 24 without damaging the anchor sleeve 14. The attachment disclosed in this patent is also secured to the drill bit at the shank of the bit and cannot be used with bits from different manufacturers that have different shaped shanks or with bits having various lengths.

Accordingly, a need exists for a universal driving and setting tool that drives and sets anchor devices, such as concrete anchors, without having to use a number of different tools. A need also exists for a universal driving and setting tool that can be used with various types and lengths of drill bits on a hammer drill.

SUMMARY OF THE INVENTION

The present invention features a driving and setting tool for use with a hammer drill to drive and set an anchor device into a substrate. The anchor device has an anchor sleeve and an anchor slug adapted to be driven into a bore of the anchor sleeve. The driving and setting tool comprises an attachment having a first interior region for receiving a bit of the hammer drill. The attachment extends around the bit for at least part of a length of the bit. A bit engaging member is disposed within the first interior region of the attachment for engaging an end of the bit. A reversible adapter is received in a second interior region of the attachment in one of at least first and second positions.

The reversible adapter includes an anchor sleeve hammering portion on a first end of the reversible adapter. The reversible adapter fits within the second interior region of the attachment in the first position with the anchor sleeve hammering portion extending outward to hammer the anchor sleeve into the substrate. The reversible adapter also includes an anchor slug hammering portion on a second end of the reversible adapter. The reversible adapter fits within the second interior region of the attachment in the second position with the anchor slug hammering portion extending outward to hammer the anchor slug into the anchor sleeve.

The anchor sleeve hammering portion is preferably wider than the anchor slug hammering portion of the reversible adapter such that the anchor sleeve hammering portion is adapted to abut a rim of the anchor sleeve and the anchor slug hammering portion is adapted to fit within the bore in the anchor sleeve. The reversible adapter preferably includes a guide portion at the first end of the reversible adapter, for extending partly into the bore of the anchor sleeve to guide the anchor sleeve hammering portion against the rim of the anchor sleeve without setting the anchor slug in the anchor sleeve. In one example, the anchor sleeve hammering portion, anchor slug hammering portion, and guide portion of the reversible adapter are formed as generally cylindrical portions. The anchor slug hammering portion and guide portion have a smaller diameter than the diameter of the anchor sleeve hammering portion. The preferred embodiment of the reversible adapter also includes a friction element, such as one or more friction rings or a sleeve, disposed around the adapter to abut the inner surface of the interior region in the attachment.

According to the preferred embodiment, the bit engaging member includes a bit receiving region having a smaller dimension than the first interior region of the attachment, for receiving an end of the bit such that the bit engaging member engages the end of the bit and prevents the bit from rotating from within the first interior region without contacting the cutting tip of the bit. A retaining sleeve is preferably disposed within the first interior region of the attachment proximate the first end of the bit engaging member for abutting and retaining the bit within the interior region. An adapter receiving portion is preferably disposed in the second interior region for abutting the reversible adapter and for receiving the anchor slug hammering portion of the reversible adapter.

The present invention also features a method of driving and setting the anchor device in the substrate. The method comprises the steps of: drilling a hole in the substrate with the hammer drill; placing the anchor sleeve with the anchor slug into the hole in the substrate; placing the attachment around a bit of the hammer drill; placing the reversible adapter in a first position on the attachment such that an anchor sleeve hammering portion faces outward; hammering the anchor sleeve into the hole with the anchor sleeve hammering portion; placing the reversible adapter in a second position on the attachment such that an anchor slug hammering portion faces outward; and hammering the slug within the bore of the anchor sleeve with the anchor slug hammering portion such that the anchor device is set within the substrate.

DESCRIPTION OF THE DRAWINGS

These and other features and advantages of the present invention will be better understood by reading the following detailed description, taken together with the drawings wherein:

FIGS. 6–9 are partial cross-sectional views of the method of using the driving and setting tool, according to the present invention.

DETAILED DESCRIPTION OF THE PREFERRED EMBODIMENT

Figure 1:
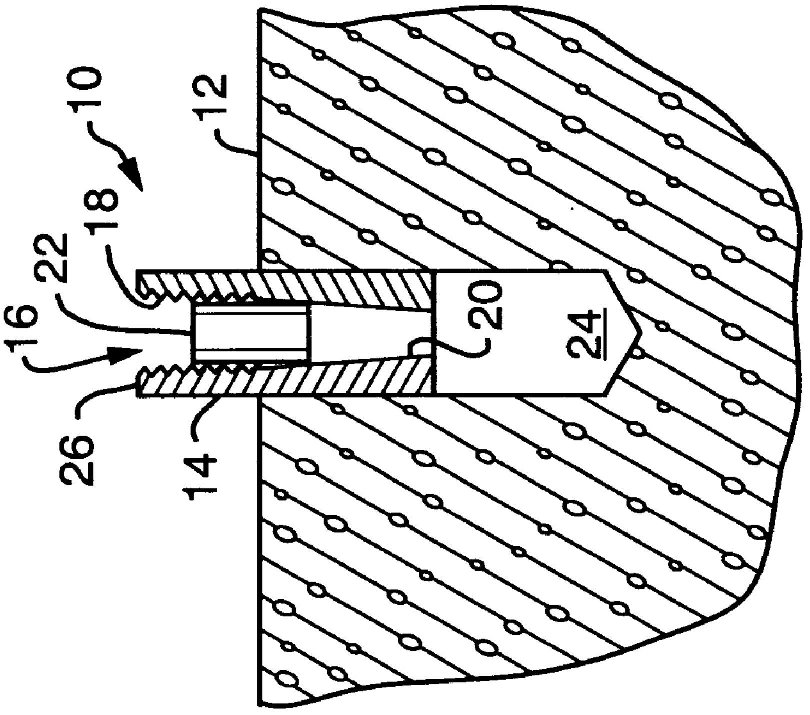
FIG. 1 (PRIOR ART)
FIG. 1 is a partial cross-sectional view of a conventional concrete anchor used with the driving and setting tool of the present invention.
Figure 2:
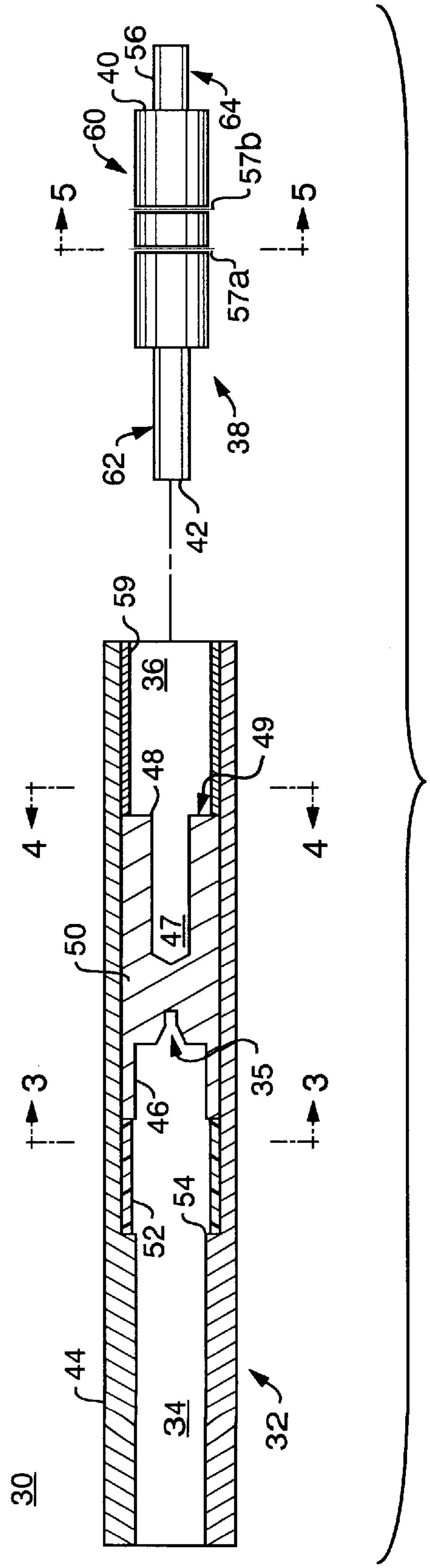
FIG. 2 is an exploded, partially cross-sectional view of a driving and setting tool, according to the present invention.

The driving and setting tool 30, FIG. 2, according to the present invention, is used to drive and set an anchor, such as a concrete anchor 10, into a substrate 12, such as concrete (FIG. 1). The driving and setting tool 30 includes an attachment 32 having a first interior region 34 for receiving a drill bit and a second interior region 36 for receiving a reversible adapter 38. The reversible adapter 38 includes an anchor sleeve hammering portion 40 at one end and an anchor slug hammering portion 42 at the other end. The reversible adapter 38 is positioned in the second interior region 36 in either a first or second position to hammer the anchor sleeve 14 or anchor slug 22, respectively, as will be described in greater detail below. Although the exemplary embodiment of the driving and setting tool 30 is for use with a hammer drill to drive and set a concrete anchor, the present invention contemplates using the driving and setting tool 30 with other types of power tools and other types of anchor devices.

Figure 8:
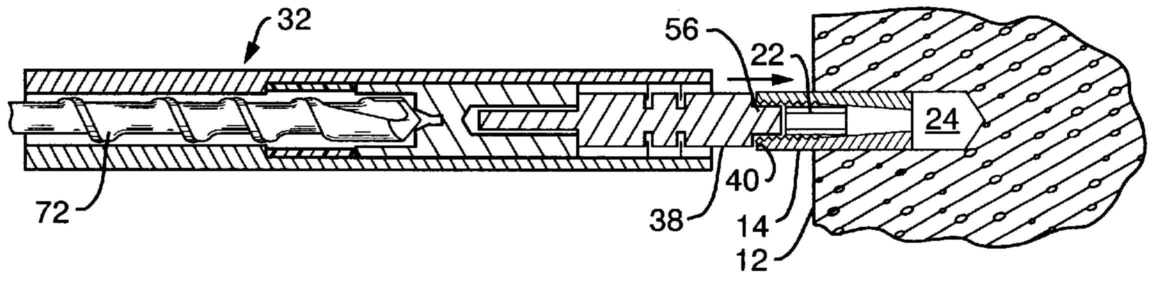
Figure 9:
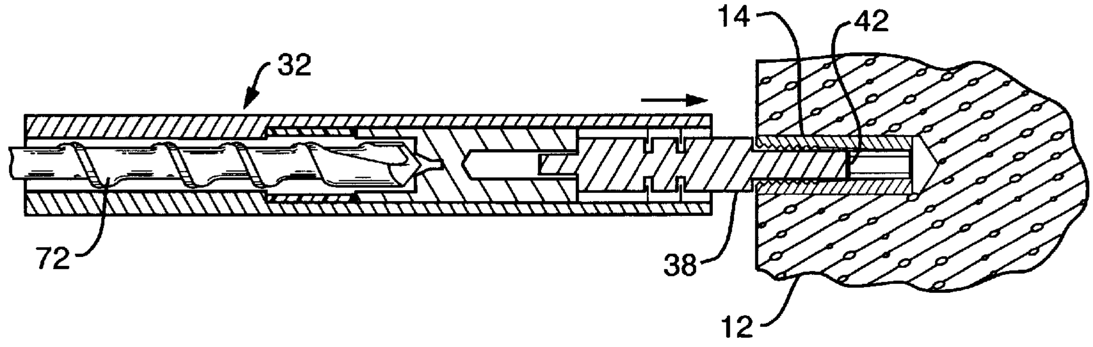

The attachment 32 preferably includes a generally cylindrical body portion 44 forming the first interior region 34 and the second interior region 36. A bit engaging portion 46 is disposed within the first interior region 34 of the attachment 32 to engage an end region of the drill bit (as shown in FIGS. 8 and 9). The bit engaging portion 46 includes a slot 35 that receives the tip of the bit, thereby engaging the sides of the end region of the bit without contacting and damaging the cutting tip of the bit. An adapter receiving portion 48 is disposed within the second interior region 36 of the attachment 32 for receiving the reversible adapter 38.

In the exemplary embodiment, the bit engaging portion 46 and adapter receiver portion 48 are formed as a single inner member 50 secured within the generally cylindrical attachment body portion 44, for example, by welding, bonding, or some other means for securing. Alternatively, the inner member 50 can be formed as one piece with the generally cylindrical attachment body 44. According to another alternative, the bit engaging portion 46 and adapter receiving portion 48 can be formed on separate inner members secured to or one piece with the attachment body 44. The attachment body 44 can be made, for example from carbon steel or other suitable materials, and the inner member 50 can be made from hardened steel or other suitable materials.

A retaining sleeve 52 made of, for example, Teflon or another suitable material, is preferably disposed within the first interior region 34 of the attachment body portion 44 proximate the bit engaging portion 46. The retaining sleeve 52 contacts and holds the end of the drill bit that is received in the first interior region 34 and engaged by the bit engaging portion 46. The retaining sleeve 52 is preferably seated against a shoulder 54 formed within the interior region 34 of the attachment body portion. Alternatively, a separate element, such as a sleeve, can be used within the interior region 34 to hold the retaining sleeve 52 in place.

Figure 3:
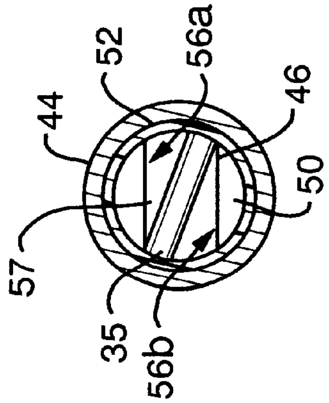
FIG. 3 is a cross-sectional view of the driving and setting tool of the present invention taken along line 3—3 in FIG. 2.

According to the preferred embodiment, the inner member 50, FIG. 3, has a generally cylindrical shape, and the bit engaging portion 46 is formed as a generally rectangular cut out section at the first end of the inner member 50, forming generally flat surfaces 56*a*, 56*b*. The generally flat surfaces 56*a*, 56*b* engage the sides of the end of a bit, thereby preventing rotation of the bit with respect to the attachment 32. The slot 35 is formed generally diagonally across the end surface 57 of the cutout section to receive the cutting tip of the bit. By engaging the end of the drill bit and not the shank of the bit, the attachment 32 can fit on drill bits from different manufacturers having different shaped shanks and different lengths. The present invention, however, contemplates various shapes and sizes for inner member 50 depending upon the shape and size of the anchor.

In one example, the attachment body portion 44 has a length of about 6" and an inner diameter of about ⅔ in. The distance between the surfaces 56*a*, 56*b* is about ⅖ in. and the inner diameter of the retaining sleeve 52 is about ⅝ in. such that the attachment 32 fits around the standard bit used to drill holes for concrete anchors. The present invention, however, contemplates various shapes and dimensions to accommodate other types and sizes of drill bits and tools.

Figure 4:
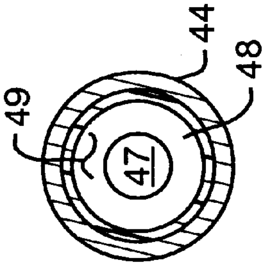
FIG. 4 is a cross-sectional view of the driving and setting tool of the present invention taken along line 4—4 in FIG. 2.

The adapter receiving member 48 preferably defines an adapter receiving region 47, FIG. 4, having a generally cylindrical shape. The adapter receiving region 47 receives the anchor slug hammering portion 42 when the reversible adapter 38 is in the first position. An end face 49 of the adapter receiving member 48 abuts the adapter 38 and supports the adapter 38 during hammering. The reversible adapter 38 preferably includes a guide portion 56 for guiding the anchor sleeve hammering portion 40 against the anchor sleeve 14, as will be described in greater detail below. The guide portion 56 is received within the adapter receiving region 47 when the reversible adapter 38 is in the second position.

Figure 5:
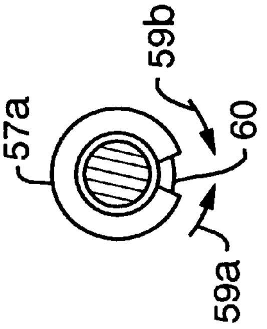
FIG. 5 is a cross-sectional view of the reversible adapter of the present invention taken along line 5—5 in FIG. 2.
Figure 6:
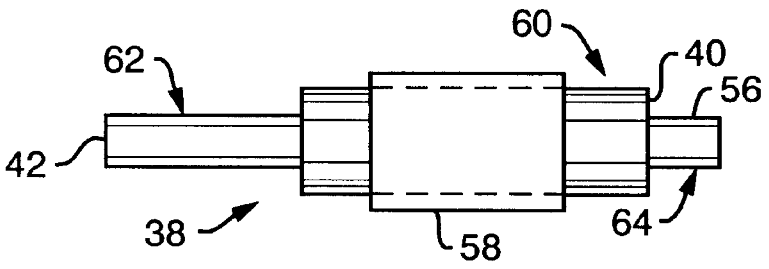
FIG. 6 is a side view of a reversible adapter, according to another embodiment of the present invention.

The reversible adapter 38 also preferably includes one or more friction rings 57*a*, 57*b* for positioning and holding the adapter 38 within the second interior region 36 of the attachment 32. Each friction ring 57*a*, FIG. 5, fits within a recess around the reversible adapter 38 and is made of a metal or other suitable material. The friction rings 57*a*, 57*b* are spring biased in the direction of arrows 59*a*, 59*b* to provide a friction fit against the inner surface of the second interior region 36 such that the adapter 38 fits snugly within the attachment 32 while also being easily removable. In an alternative embodiment, the reversible adapter 38, FIG. 6, includes an adapter positioning sleeve 58 made, for example, of Teflon that abuts the inner surface of the second interior region 36 of the attachment 32. The present invention also contemplates other types of friction elements for retaining the reversible adapter 38 in the second interior region 36. A retaining sleeve 59 can also be positioned within the second interior region 36 to facilitate retaining the reversible adapter 38.

According to one embodiment, the anchor sleeve hammering portion 40, anchor slug hammering portion 42, and guide portion 56 are formed as first, second and third generally cylindrical body portions 60, 62, 64. The first generally cylindrical body portion 60 forming the anchor sleeve hammering portion 40 preferably has a larger diameter than the second and third generally cylindrical body portions 62, 64 forming the anchor slug hammering portion 42 and guide portion 56. Thus, the anchor slug hammering portion 42 and guide portion 56 fit within the bore 16 of the anchor 10 and the anchor sleeve hammering portion 40 fits against the outer rim 26 of the anchor sleeve 14. The reversible adapter 38 can be made from a hardened steel or other suitable materials.

In one example, the length of the first cylindrical portion 60 forming the anchor sleeve hammering portion 40 is about 1.5 in. with a diameter of about 0.5 in. The length of the second cylindrical portion 62 forming the anchor slug hammering portion 42 is about ⅞ in. and the length of the third generally cylindrical body portion 64 forming the guide portion 56 is about 7/16 in. Both the second and third generally cylindrical body portions 62, 64 have a diameter of about ¼ in. The length of the adapter positioning sleeve 58 is about ½ in. with a wall thickness of about ⅙ in. The present invention, however, contemplates various shapes and sizes for the reversible adapter 38 depending upon the type, shape, and size of the anchor.

Figure 7:
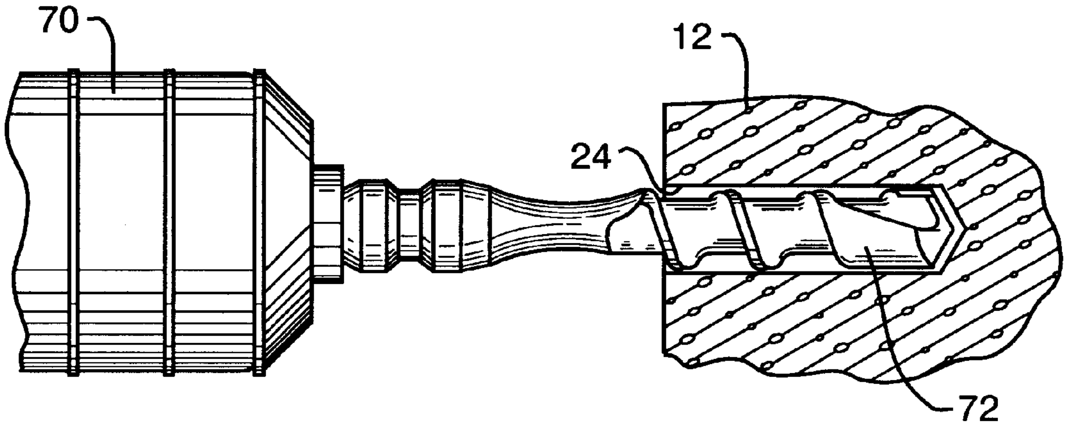

According to the method of using the driving and setting tool 30, FIGS. 7–9, the hole 24 is first drilled in the substrate 12. In one example, a conventional hammer drill 70 is used with a standard drill bit 72 for drilling concrete, as is well known in the art.

Once the hole 24 has been drilled, the anchor sleeve 14 with the anchor slug 22 is placed into the hole 24 in the substrate 12 (FIG. 8). The attachment 32 is placed around the drill bit 72 on the hammer drill 70 and the reversible adapter 38 is positioned in the first position in the attachment 32 such that the anchor sleeve hammering portion 40 faces outward. The guide portion 56 is then positioned within the bore 16 of the anchor sleeve 14 and the anchor sleeve hammering portion 40 is positioned against the outer rim 26 of the anchor sleeve 14. The hammer drill 70 is then activated to hammer the anchor sleeve 14 into the hole 24 without setting the anchor slug 22.

The reversible adapter 38 is then positioned in the second position such that the anchor slug hammering portion 42 faces outward (FIG. 9). The anchor slug hammering portion 42 is then positioned within the bore 16 of the anchor sleeve 14 and the hammer drill 70 is actuated to hammer the anchor slug 22 into the anchor sleeve 14, thereby securing the anchor sleeve within the hole 24 and setting the anchor. The same tool 30 can thus be used to hammer the anchor sleeve 14 as well as the anchor slug 22, facilitating the installation of concrete anchors.

Figure 10:
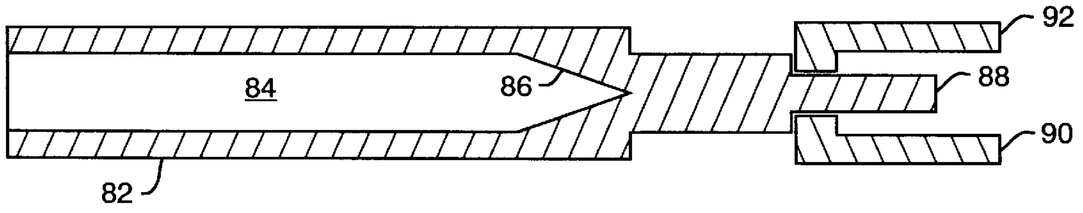
FIGS. 10 and 11 are cross-sectional views of a driving and setting tool, according to an alternative embodiment of the present invention.
Figure 11:
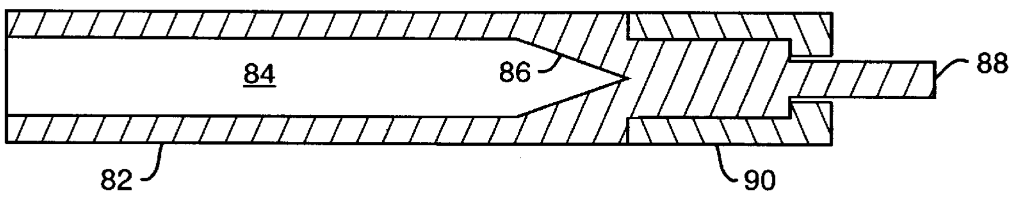

An alternative embodiment of the driving and setting tool 80, FIGS. 10 and 11, includes an attachment 82 having an interior region 84 and a bit engaging portion 86 formed as a generally V-shaped portion within the interior region 84. The attachment 82 includes an anchor slug hammering portion 88 at one end of the attachment 82. A reversible adapter 90 is disposed over the anchor slug hammering portion 88 and includes an anchor sleeve hammering portion 92. In a first position (FIG. 10), the reversible adapter 90 is disposed over the anchor slug hammering portion 88 such that the anchor sleeve hammering portion 92 extends outwardly to engage the anchor sleeve 14. In a second position (FIG. 11), the reversible adapter 90 extends over the anchor slug hammering portion 88 such that the anchor slug hammering portion 88 extends outwardly to engage the anchor slug 22 and drive the anchor slug 22 within the anchor sleeve. This embodiment of the universal driving and setting tool is used generally in accordance with the method described above.

The present invention also contemplates other embodiments of the attachment and adapter capable of fitting over a drill bit and the adapter capable of hammering both the anchor sleeve and anchor slug of a conventional concrete anchor.

Accordingly, the present invention provides a universal driving and setting tool capable of being used with a hammer drill having various types and lengths of bits. The universal driving and setting tool facilitates hammering both the anchor sleeve and anchor slug in a conventional concrete anchor without requiring additional tools.

Modifications and substitutions by one of ordinary skill in the art are considered to be within the scope of the present invention which is not to be limited except by the claims which follow.

What is claimed is:

1. A driving and setting tool, for use with a hammer drill to drive and set an anchor into a substrate, said anchor having an anchor sleeve and an anchor slug adapted to be driven into a bore of said anchor sleeve, said driving and setting tool comprising:

an attachment having a first interior region, for receiving a bit of said hammer drill, and a bit engaging member disposed within said first interior region of said attachment, for engaging an end of said bit, wherein said attachment extends around said bit for at least part of a length of said bit; and a reversible adapter, for being received in a second interior region of said attachment in one of at least first and second positions, said reversible adapter including:

an anchor sleeve hammering portion on a first end of said reversible adapter, wherein said reversible adapter fits within said second interior region of said attachment in said first position with said anchor sleeve hammering portion extending outward to hammer said anchor sleeve into said substrate; and an anchor slug hammering portion on a second end of said reversible adapter, wherein said reversible adapter fits within said second interior region of said attachment in said second position with said anchor slug hammering portion extending outward to hammer said anchor slug into said bore of said anchor sleeve, thereby setting said anchor.

2. The driving and setting tool of claim 1 wherein said anchor sleeve hammering portion of said reversible adapter is wider than said anchor slug hammering portion of said reversible adapter, such that said anchor sleeve hammering portion is adapted to abut a rim of said anchor sleeve and said anchor slug hammering portion is adapted to fit within said bore in said anchor sleeve.

3. The driving and setting tool of claim 1 wherein said reversible adapter includes a guide portion at said first end of said reversible adapter, for extending partly into said bore of said anchor sleeve to guide said anchor sleeve hammering portion against said rim of said anchor sleeve without setting said anchor slug in said anchor sleeve.

4. The driving and setting tool of claim 1 wherein said reversible adapter includes a first generally cylindrical body portion, wherein a first end of said first generally cylindrical body portion forms said anchor sleeve hammering portion.

5. The driving and setting tool of claim 4 wherein said reversible adapter includes a second generally cylindrical body portion extending from a second end of said first generally cylindrical body portion and having a smaller diameter than said first generally cylindrical body portion, wherein said second generally cylindrical body portion forms said anchor slug hammering portion.

6. The driving and setting tool of claim 5 wherein said reversible adapter includes a third generally cylindrical body portion extending from said first end of said first generally cylindrical body portion and having a smaller diameter than said first generally cylindrical body portion, for extending partly into said bore of said anchor sleeve to guide said anchor sleeve hammering portion against said rim of said anchor sleeve without setting said anchor slug in said anchor sleeve.

7. The driving and setting tool of claim 4 further including at least one friction ring disposed in an annular recessed region in said first generally cylindrical body portion, wherein said at least one friction ring abuts an inner surface of said second interior region in said attachment.

8. The driving and setting tool of claim 4 further including an adapter positioning sleeve disposed around said first generally cylindrical body portion, wherein said sleeve abuts an inner surface of said second interior region in said attachment.

9. The driving and setting tool of claim 1 wherein said bit engaging member includes a bit receiving region at a first end having a smaller dimension than said first interior region of said attachment, for receiving said bit such that said bit engaging member contacts an end of said bit proximate a cutting tip of said bit without contacting said cutting tip of said bit.

10. The driving and setting tool of claim 1 further including an adapter receiving portion in said second interior region, for abutting said reversible adapter and for receiving said anchor slug hammering portion of said reversible adapter.

11. The driving and setting tool of claim 9 further including a retaining sleeve disposed within said first interior region of said attachment proximate said first end of said bit engaging member, for abutting and retaining said bit within said first interior region.

12. The driving and setting tool of claim 9 wherein said bit engaging member includes a slot for receiving said cutting tip and flat surfaces extending from said for engaging said end of said bit.

13. A driving and setting tool, for use with a hammer drill to drive and set an anchor into a substrate, said anchor having an anchor sleeve and an anchor slug adapted to be driven within said anchor sleeve, said driving and setting tool comprising:

an attachment body portion having a first interior region, for receiving a bit of said hammer drill, wherein said attachment body portion extends around said bit for at least part of a length of said bit;

a bit engaging member disposed within said first interior region of said attachment body portion, said bit engaging member including a bit receiving region at a first end having a smaller dimension than said first interior region of said attachment body portion, for receiving said bit such that said bit engaging member contacts an end of said bit proximate a cutting tip of said bit without contacting said cutting tip of said bit;

a reversible adapter, for being removably coupled to said attachment body portion in one of at least first and second positions, wherein said driving and setting tool is adapted to hammer said anchor sleeve when said reversible adapter is in said first position, and wherein said driving and setting tool is adapted to hammer said anchor slug when said reversible adapter is in said second position.

14. The driving and setting tool of claim 13 wherein said reversible adapter includes:

an anchor sleeve hammering portion on a first end of said reversible adapter, wherein said reversible adapter fits within said second interior region of said attachment body portion in said first position with said anchor sleeve hammering portion extending outward to hammer said anchor sleeve into said substrate;

a guide portion extending from said anchor sleeve hammering portion, for extending partly into said bore of said anchor sleeve to guide said anchor sleeve hammering portion against a rim of said anchor sleeve without setting said anchor slug in said anchor sleeve; and an anchor slug hammering portion on a second end of said reversible adapter, wherein said reversible adapter fits within said second interior region of said attachment body portion in said second position with said anchor slug hammering portion extending outward to hammer said anchor slug into said anchor sleeve.

15. The driving and setting tool of claim 14 further including at least one friction element disposed around said reversible adapter, wherein said friction element abuts an inner surface of said second interior region in said attachment body portion.

16. The driving and setting tool of claim 15 wherein said first generally cylindrical body portion has a larger diameter than said second and third generally cylindrical body portions.

17. The driving and setting tool of claim 13 wherein said reversible adapter includes an anchor sleeve hammering portion that extends outward when said reversible adapter is in said first position, and wherein said attachment body portion includes an anchor slug hammering portion extending from one end of said attachment body portion and beyond said reversible adapter when said reversible adapter is in said second position.

18. The driving and setting tool of claim 13 wherein said bit engaging member includes a slot for receiving said cutting tip and flat surfaces extending from said slot for engaging said end of said bit.

19. A method of driving and setting an anchor device in a substrate using a hammer drill and a driving and setting tool, said driving and setting tool including an attachment and a reversible adapter, said anchor device including an anchor sleeve having a bore and an anchor slug positioned within said bore, said method comprising the steps of:

drilling a hole in said substrate with said hammer drill;

placing said anchor sleeve with said anchor slug into said hole in said substrate;

placing said attachment around a bit of said hammer drill such that a bit engaging member within said attachment contacts an end of said bit proximate said cutting tip without contacting said cutting tip;

placing said reversible adapter in a first position on said attachment such that an anchor sleeve hammering portion faces outward;

hammering said anchor sleeve into said hole with said anchor sleeve hammering portion;

placing said reversible adapter in a second position on said attachment such that an anchor slug hammering portion faces outward; and hammering said slug within said bore of said anchor sleeve with said anchor slug hammering portion such that said anchor device is set within said substrate.

20.The method of claim 19 wherein said substrate is concrete and wherein said anchor device is a concrete anchor.

21. The method of claim 19 wherein said anchor sleeve hammering portion is disposed on one end of said reversible adapter, and wherein said anchor slug hammering portion is disposed on another end of said reversible adapter.

22. The method of claim 19 wherein said anchor sleeve hammering portion is disposed on an end of said reversible adapter, and wherein said anchor slug hammering portion is disposed on an end of said attachment.

* * * * *